United States Patent [19]
Poschenrieder et al.

[11] 3,754,105
[45] Aug. 21, 1973

[54] CIRCUIT ARRANGEMENT FOR ECHO SUPPRESSION IN A VOICE CIRCUIT ON A FOUR-WIRE TRANSMISSION SYSTEM UPON TRANSFER TO A TWO-WIRE TRANSMISSION LINE

[76] Inventors: Werner Poschenrieder, Schuckertstrasse 14, 8000 Munich 25; Hermann Bendel, Ziehrerstrasse 10, 8000 Munich 71, both of Germany

[22] Filed: June 7, 1972

[21] Appl. No.: 225,050

Related U.S. Application Data

[63] Continuation-in-part of Ser. No. 884,877, Dec. 15, 1969.

[30] Foreign Application Priority Data

Dec. 20, 1968 Germany .................. P 18 16 153.0

[52] U.S. Cl. .............................................. 179/170.2
[51] Int. Cl. .............................................. H04b 3/20
[58] Field of Search ...................... 179/170.2, 170.6, 179/170.8

[56] References Cited

UNITED STATES PATENTS

| | | | |
|---|---|---|---|
| 3,465,106 | 9/1969 | Nagata | 179/170.2 |
| 3,500,000 | 3/1970 | Kelly | 179/170.2 |
| 3,588,385 | 6/1971 | Moye | 179/170.2 |
| 3,660,619 | 5/1972 | Chiba | 179/170.2 |

*Primary Examiner*—Ralph D. Blakeslee
*Attorney*—Carlton Hill, J. Arthur Gross et al.

[57] ABSTRACT

An echo suppression arrangement for a four-wire to two-wire transfer in a communication system employs a first echo suppressor which is normally inactive and which is rendered active in response to a first comparator of the first echo suppressor and a second comparator of an echo canceller when echo simulation of the canceller is inadequate to compensate for the instant echo.

4 Claims, 5 Drawing Figures

Patented Aug. 21, 1973 3,754,105

2 Sheets-Sheet 1

INVENTORS
Werner Poschenrieder
Hermann Bendel

BY Hill, Sherman, Meroni, Gross & Simpson ATTYS.

CIRCUIT ARRANGEMENT FOR ECHO SUPPRESSION IN A VOICE CIRCUIT ON A FOUR-WIRE TRANSMISSION SYSTEM UPON TRANSFER TO A TWO-WIRE TRANSMISSION LINE

CROSS REFERENCE TO RELATED APPLICATION

This application is a continuation-in-part of our earlier application of the same title, Ser. No. 884,877, filed Dec. 15, 1969.

BACKGROUND OF THE INVENTION

1. Field of the Invention

The invention relates to a circuit arrangement for echo suppression in a voice circuit on a four-wire transmission system upon transfer to a two-wire transmission line connected into the directions of transmission of the four-wire transmission line to be locked upon as sending line and receiving line with respect to the transfer.

2. Description of the Prior Art

Audible echos may occur in telephone communications. They make the speaking subscriber uncertain, because they are looked up on as utterances of the other subscriber, and they are the more disturbing, the farther the communication, the smaller the transmission speed of the medium, and the smaller the attenuation. Echo suppressors aim at preventing these interferences by strongly attenuating or completely forestalling the echo currents coming from two-four wire circuits at the ends of a telephone connection and from the reflection points between the two-four wire circuits and the subscribers' sets. These echo suppressors are normally interposed at both terminals of the long-distance telephone connection.

Siemens Journal 1967, No. 9, pp. 772 to 774 discloses a type of echo suppressors switched into the transmission line and receiving line of a four-wire connection adjacent a hybrid circuit for transfer to a two-wire connection. Its function is explained below.

The voice levels on the four-wire end of the two-four wire circuit are evaluated by a leveling means such that the output signals of a voice detector on the sending end and of a voice detector on the receiving end are rectified and subtracted in a differential detector. Moreover, the rectified output voltage of the voice detector on the receiving end is fed to a timing element and to a switching element which always, when there is a predetermined minimum voice level in the receiving line, caues a suppression of the sending line upon being switched into the sending line to open the sending line. However, the differential detector is coupled with a timing element and with a relay connected on the load side such that upon exceeding the predetermined threshold in the receiving line and concurrent preponderance of the level of the sending line the suppression of the transmission line ceases and four-terminal attenuation network compressing the sound volume range is switched in.

Echo suppressors of this character can effectively suppress echo currents, because upon arrival of voice currents they temporarily interrupt the return direction of the voice circuit. A drawback of this advantage is that the echo suppressor, when both subscribers are talking, must first prove whether the voice currents of the return direction are genuine echo currents or whether they come from the other subscriber. This is difficult to determine and, under certain circumstances, requires a great deal of time if the sound volumes of the two subscribers in the echo suppressor differ greatly. For example, the first words of the interrupting subscriber can get lost or become garbled so that the conversation is rendered difficult, particularly in voice circuits of satellites having a great time delay. Since this suppressor, due to the switching connected with the time constant, temporarily exercises a non-linear influence, it is also called a "non-linear echo suppressor."

Recently a second type of echo suppressor has come into use which does not have this non-linearity, so that the same may be called "linear echo suppressors" or echo cancellers. This echo suppressor is described, for example, in "The Bell System Technical Journal" Dec. 1966, pp. 1851 and March 1967, pp. 497 to 511. In this linearly operating echo canceller there is provided an echo simulator fed by the voice signal of the receiving line which feeds a subtraction device switched into the sending line and is regulated by the output signal of the subtraction device via an error signal control circuit, such that the echo crossing over the two-four wire circuit into the sending line from the receiving line is most effectively compensated with the artificial apparent echo produced from the voice currents via the control circuit and the echo simulator. In this case, the characteristics of the echo line need only be simulated at the start of the conversation. As a rule, during the entire conversation nothing is changed in the voice circuit. Consequently, words cannot be lost or garbled when this method is utilized. Nevertheless, according to the results achieved heretofore, only compensation attenuations between 20 to 25 dB have been accomplished with these linearly operating echo suppressors. These attenuation values of the echo may be sufficient in many cases since the telephone two-four wire circuit can greatly attenuate the echo. However, the longer the four-wire connection and the greater the time delay differences, the more heavily the echo signals must be attenuated to assure a smooth telephone communication. For example, in the case of communications via satellites, wherein the spoken word of a subscriber may return to him with a delay of up to 700 msec. attenuation values of about 50 dB are necessary, so that the echo does not disturb the talking subscriber.

Since in many cases the necessary echo attenuation is not achieved with the linear echo suppressor, it is the broad object of the invention to provide a circuit arrangement wherein the advantages of the two echo suppressors described above are combined with one another and their drawbacks avoided.

SUMMARY OF THE INVENTION

Taking as a starting point a circuit arrangement of the type described at the beginning, the present invention solves this problem by arranging a first echo suppressor after a second echo suppressor (echo canceller) with respect to the sending line and by normally interconnecting the first echo suppressor relative to the two voice lines, and by controlling the second echo suppressor (echo canceller) through an error signal control circuit in a manner such that the first echo suppressor is activated when the echo in a subtraction device is inadequately compensated.

The result of these steps is that during a large portion of the entire conversation period clear messages can be transmitted in both conversation directions without loss of words or garbles, but there are also improvements in the other cases, since a compensation attenuation of 10 . . . 20 dB greatly facilitates the determination in the first echo suppressor whether the voice currents are echo currents or come from the second subscriber, thus reducing the loss of words.

The first and second echo suppressors may be constructed as one constructional unit in an advantageous development of the invention.

BRIEF DESCRIPTION OF THE DRAWINGS

Further objects, features, and advantages of the present invention will be readily apparent from the preferred embodiments shown in the drawings, wherein.

DESCRIPTION OF THE PREFERRED EMBODIMENT

Figures 1, 2:
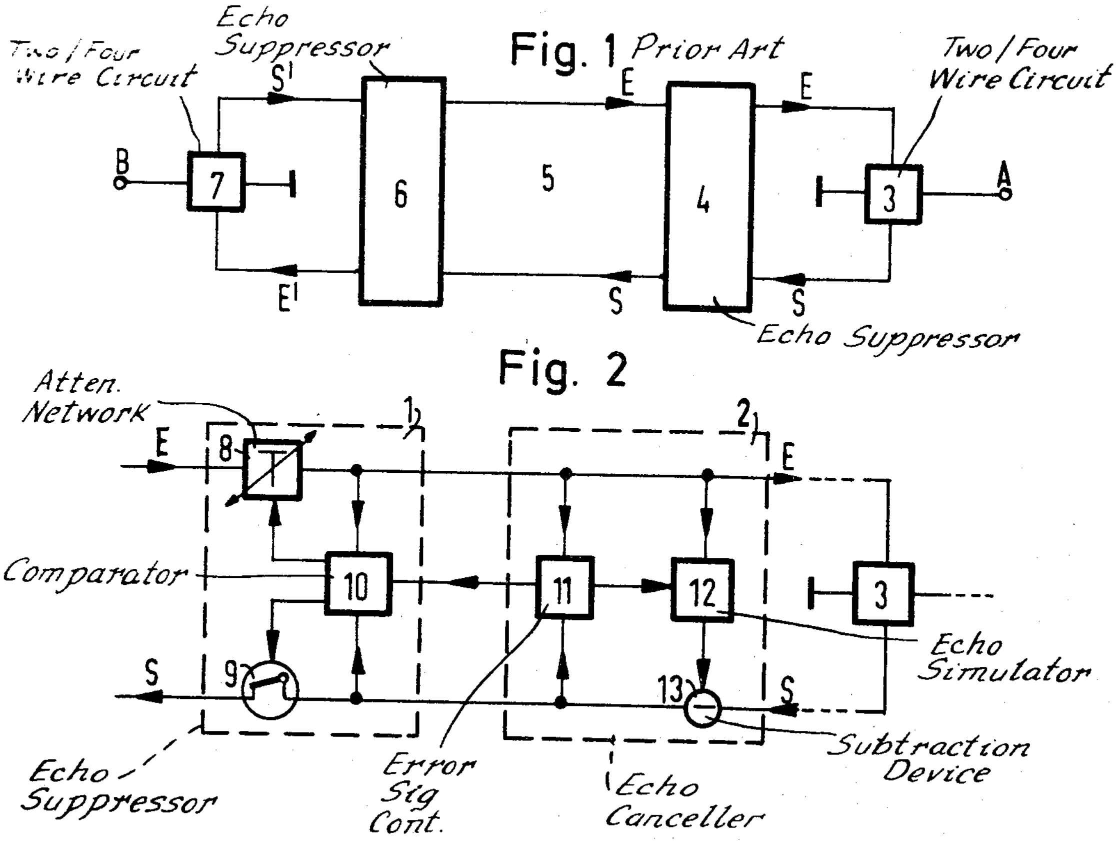
Fig. 1 Prior Art, Fig. 2
FIG. 1 shows a voice circuit on a long-distance transmission system having two two-four wire circuits and two echo suppressors associated therewith.
FIG. 2 is a diagrammatic view of an echo suppressor comprising a non-linear echo suppressor and a linear echo suppressor (echo canceller) connected in accordance with the principles of the present invention for use in a system as illustrated in FIG. 1.

FIG. 1 shows a voice circuit between two subscribers A and B. This voice circuit extends between a subscriber A and a two-four wire circuit 3 as well as between a subscriber B and a two-four wire circuit 7, in each case over a two-wire line, between the circuit 3 and the circuit 7 over a four-wire line. Within the four-wire line a echo suppressor 4 is associated with the circuit 3, and a echo suppressor 6 is associated with the circuit 7. Between the echo suppressors 4 and 6 there is a comparatively long transmission line 5 burdened with time delay, for example, a satellite connection or a submarine cable line. Moreover, between an echo suppressor and the two-four wire circuit associated therewith there may be still longer four-wire transmission lines.

FIG. 2 is a diagrammatic view of the echo suppressor 4 associated with the circuit 3 and comprising a non-linear echo suppressor 1 and a linear echo suppressor 2 which are serially connected into the four-wire transmission line consisting of the forward direction and the return direction. The echo circuit 2 is hereinafter referred to as an echo canceller. Viewed from the associated circuit 3, one transmission direction is designated as sending line S and the other transmission direction as receiving line E. With regard to the sending line S the first, non-linear echo suppressor 1 is arranged after the echo canceller 2. The conditions are reversed with respect to the receiving direction.

In principle, the non-linear echo suppressor 1 has switching means 9 in the sending line S, which is controlled to open and close the line by a comparator 10. This comparator 10 evaluates the levels of the sending line S and of the receiving line E such that upon preponderance of the level on the receiving line E the sending line S is severed. Conversely, the echo suppressor 6 associated with the subscriber B would cut the sending line S'. When the two subscribers A and B are speaking at the same time, the respective switching means 9 remain permeable, but a controllable four-terminal attenuation network 8, which is likewise controlled by the comparator 10, is switched with an adjusted attenuation into the receiving line E of the echo suppressor 4, or into the receiving line E', of the echo suppressor 6 of the other subscriber B.

In accordance with the invention, the above-described manner of operation of the non-linear echo suppressor 1 is suppressed as long as the echo canceller 2 is capable of performing its task in a satisfactory manner. Accordingly, the comparator 10 is not activated by an error signal control circuit 11 until a predetermined echo level at the output of the subtraction device 13 in the sending line S is exceeded.

The heart of the echo canceller is an echo simulator 12 which is fed from the receiving line E and the echo which occurs in the sending line S because a portion of the speaking energy of the receiving line E returns into the sending line S over the circuit 3, is simulated. This simulated echo signal is fed to the differentiator 13 which is switched into the sending line S. In this manner, the echo signal and the simulated echo signal cancel each other out at the output of the subtraction device 13. This output of the subtraction device 13 is thereafter connected with the error signal control circuit 11 which is likewise fed from the receiving line E and regulates the echo simulator 12 to maximum compensation. If a predetermined quality of the compensation in the differentiator 13 cannot be achieved, the error signal control circuit 11 activates the comparator 10 in the non-linear echo suppressor 1 so that the latter can bring its additional echo suppression to bear.

Figure 3:
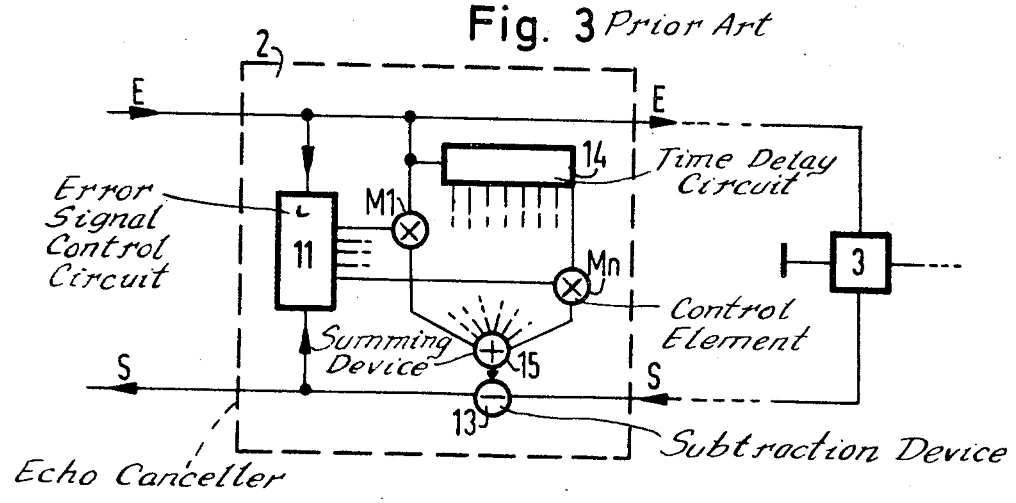
Fig. 3 Prior Art
FIG. 3 is a schematic diagram of a preferred construction of the echo canceller of FIG. 2.

FIG. 3 shows a further detail of a preferred embodiment of known construction of the echo canceller 2. In this embodiment the echo simulator 12 includes a time delay element 14 having a greater number ($n$) of taps. Each of these taps is associated with one of the final control elements Ml to Mn. The outputs of these final control elements are combined into a summing device 15 which feeds the simulated echo signal to the subtraction device 13. At the beginning of each conversation the error signal control circuit 11, which is connected to the output of the subtraction device 13 and also to the receiving line E, evaluates the result of the compensation and controls the individual final control elements Ml to Mn by means of correlation means until an optimum of the compensation is achieved.

According to the invention, during this compensation process the first, non-linear suppressor 1 is out of action, that is to say, the sending line S and the receiving line E therein are interconnected. Not until it has been determined that a certain predetermined value of the echo suppression in the echo canceller 2 cannot be achieved does the activation of the non-linear echo suppressor 1 take place.

To accelerate the compensation process, a test signal may also be injected into the receiving line at the beginning of the communication by which the transmission line for the echo can be seized more rapidly and more accurately via the two-four wire circuit.

A permanent test signal with a correspondingly lowered level for repeating the compensation process during the conversation, for example when the two wire line connected to the two-four wire circuit is changed, may likewise be of advantage.

The four terminal network in the echo canceller 2 for activating the echo suppressor is explained in the following reference to FIGS. 4 and 5.

Figure 4:
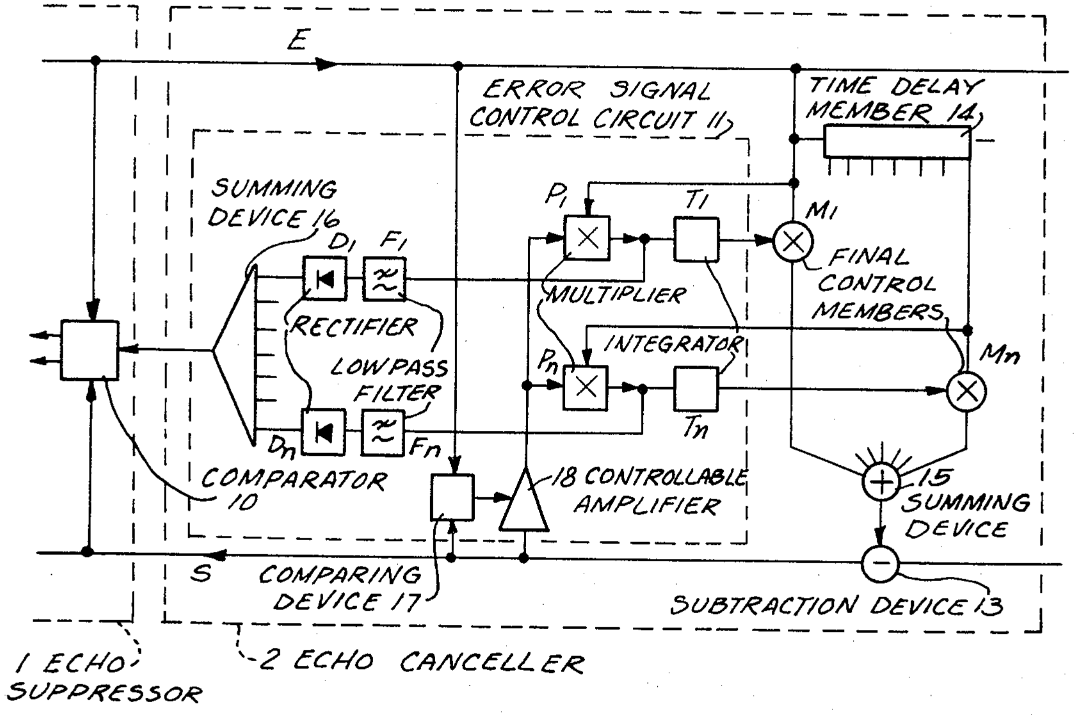
FIGS. 4 and 5 illustrate the apparatus of FIGS. 2 and 3 in greater detail.

FIG. 4 illustrates the error signal control circuit 11 of the echo canceller 2 of FIG. 3 in greater detail. The error signal control circuit 11 comprises a number of multipliers Pl–Pn corresponding to the number of taps on the time delay member 14. The outputs of the multipliers Pl-Pn adjust respective final control members Ml–Mn by way of respective integrators Tl–Tn. The respective first input of the multiplier is controlled by the assigned output signal of the time delay member 14; the respective second inputs of the multiplier are set with the output signal of the subtraction device 13 by way of a controllable amplifier 18. The amplification of the amplifier 18 is controlled by a comparing device 17 which compares the speech signals of the arriving path E with those of the departing path S and the output of the subtraction device 13 and throttles the amplification of the amplifier 18, for example the comparing device 17 renders the amplification zero in every case when the signal of the arriving path E is smaller than that of the departing path S. This results in freezing the adjusting process of the control members Ml–Mn for those time intervals in which the arriving signals in the receiving path E becomes unusable for correlation.

In order to obtain activation signals for activating the echo suppressor 1 by means of the echo canceller 2, each one of the output signals of the multipliers Pl–Pn is applied to the additional summing device 16 by way of low pass filters Fl–Fn, respectively, and the respective double path rectifier of the circuits Dl–Dn which are connected between the filters and the summing device 16. The output signal of the summing device 16 represents a measure for the balancing or cempensating state of the final control members Ml–Mn and therefore a measure for the quality of echo compensation of the echo canceller 2. The output signal of the additional summing device 16 is then applied to the comparator 10 of the echo suppressor 1.

In order to obtain the activation signal, it is not required that all output signals of the multipliers Pl–Pn be applied to the summing device 16 by way of a low pass filter and a double path rectifier arrangement, respectively. When fewer demands are made with respect to the discrimination accuracy, it will suffice to apply a portion of the output signals, or even only a single one of the output signals of the multipliers by way of a low pass filter and a double path rectification circuit. In the latter case, the summing device 16, of course, will be omitted.

Figure 5:
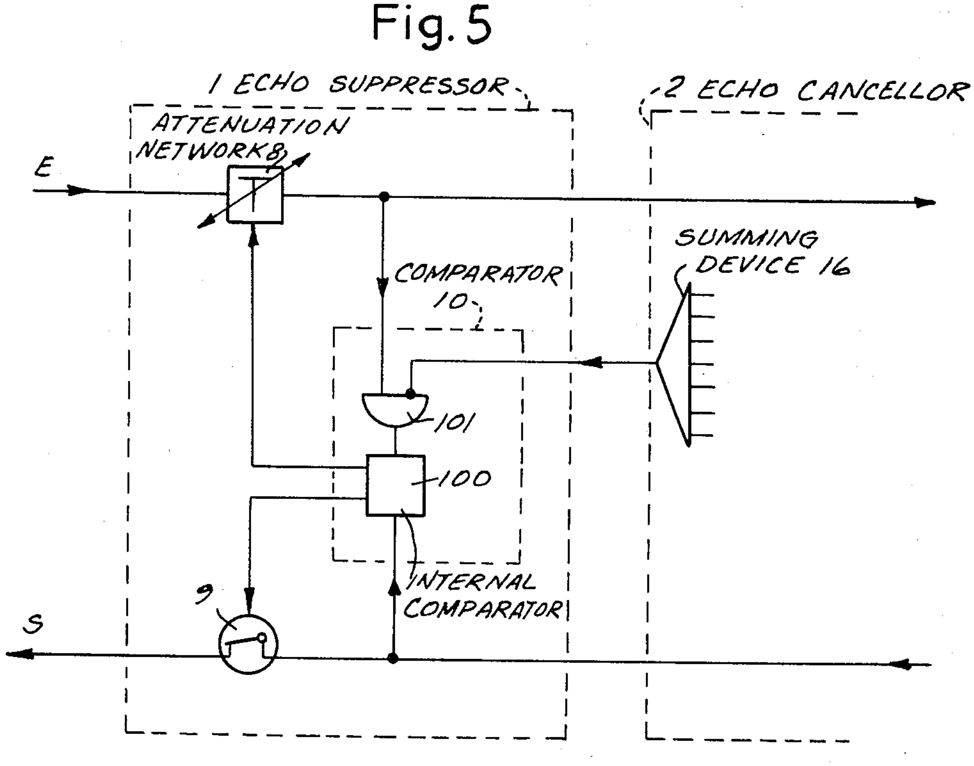

FIG. 5 illustrates the echo suppressor 1, wherein, according to the arrangement of FIG. 2, the comparator 10 is illustrated in greater detail insofar as is required for the explanation of the control of the echo suppressor 1 by means of the echo canceller 2. The comparator 10 includes the internal comparator 100 which itself carries out the evaluation of the speech signals on the receiving path side and the transmitting path side. However, a gate 101 is connected ahead of the internal comparator 100 in view of the supply of speech signals of the receiving path E. The gate 101 is opened and closed by the activation signal arriving from the summing device 16 of the echo canceller 2 in such a way that the gate 101 is usually closed and becomes open only when the activation signal exceeds a certain predetermined minimum level. Since, however, as explained before, the comparator 10 or the internal comparator 100 is constructed in such a way that it only then has an effect on the transmission path suppressor 9 and also on the damping member 8 when the level of the receiving path E exceeds that of the sending path S, the echo suppressor 1 becomes ineffective as long as it is not activated by the echo canceller 2.

Of course, other methods of blocking the normal mode of functioning of the echo suppressor are possible. In particular, that arrangement can be applied here which has become known as a "disabler" and which is required for blocking the echo suppressor during data transmission.

Many changes and modifications of the invention may become apparent to those skilled in the art without departing from the spirit and scope of the appended claims which define what is believed to be new and desired to have protected by Letters Patent.

We claim:

1. An arrangement for echo suppression in a voice circuit on a four-wire transmission system upon transfer to a two-wire transmission line switched into the transmission directions of the four-wire transmission line to be looked upon as a sending line and a receiving line with respect to the transfer wherein a first echo suppressor is provided with switching means switched into the sending line controlled by a first comparator and a second echo suppressor provided with an echo simulator fed by the signal of the receiving line, said echo simulator feeding a subtraction device switched into the sending line and being controlled by the output signal of the subtraction device via a second comparator circuit, the improvement therein residing in that said first echo suppressor is connected after said second echo suppressor relative to the sending line and that said first echo suppressor is normally interconnected to both voice lines, and said second echo suppressor comprises an error signal control circuit connected to control the operation of said first echo suppressor such that the first echo suppressor is activated only when there is inadequate compensation of the echo in the second echo suppressor.

2. An arrangement according to claim 1, characterized in that the first and the second echo suppressors form one constructional unit.

3. An arrangement according to claim 1, characterized in that the first echo suppressor comprises a four-terminal attenuation network to be switched into the receiving line and said first comparator is connected to control said four-terminal attenuation network in response to the operation of said error signal control circuit of the second echo suppressor.

4. An arrangement according to claim 3, characterized in that said four-terminal attenuation network compresses the sound volume range of the voice signal of the receiving line in response to the control signals of said first comparator and of said error signal control circuit.

* * * * *